United States Patent [19]

Urai

[11] Patent Number: 4,579,388
[45] Date of Patent: Apr. 1, 1986

[54] SEAT

[75] Inventor: Muneharu Urai, Tokyo, Japan

[73] Assignee: Tachikawa Spring Co., Ltd., Tokyo, Japan

[21] Appl. No.: 628,148

[22] Filed: Jul. 5, 1984

[51] Int. Cl.[4] .................................................. A47C 7/02
[52] U.S. Cl. ..................... 297/452; 297/455; 297/DIG. 1
[58] Field of Search ................. 156/308.4; 5/471, 472, 5/481, 474, 402, 406, 407; 297/455, 452, DIG. 1

[56] References Cited

U.S. PATENT DOCUMENTS

| | | | |
|---|---|---|---|
| 2,801,948 | 8/1957 | Walker | 156/308.4 |
| 2,946,713 | 7/1960 | Dusina, Jr. et al. | 156/308.4 |
| 2,956,723 | 10/1960 | Tritsch | 156/308.4 |
| 3,107,190 | 10/1963 | Kevelin | 5/471 |
| 3,679,263 | 7/1972 | Cadiou | 297/DIG. 1 |
| 3,940,812 | 3/1976 | Zapf | 112/418 |
| 4,360,550 | 11/1982 | Asakura | 428/192 |

Primary Examiner—James T. McCall
Attorney, Agent, or Firm—Oldham, Oldham & Weber Co.

[57] ABSTRACT

In a seat comprising a trim cover formed by heat-bonding necessary portions including a main portion formed of a covering material, a filler pad and a backing material to provide the central seating portion of the seat and combined with inner side portions, outer side portions and a welt, the welt is provided by winding a welt cover or an extension of the covering material or inner side portions around a cord, the filler pad is formed of a usual polyurethane material, and the trim cover is bonded to a cushion member having no skin or having a minimum skin.

9 Claims, 12 Drawing Figures

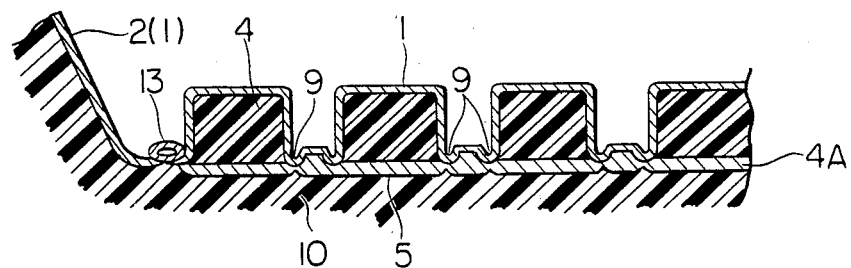
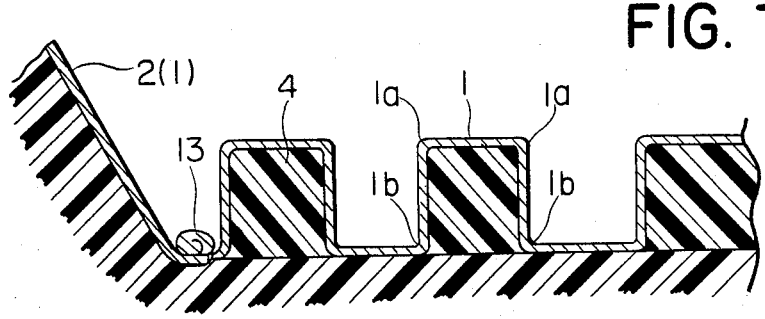
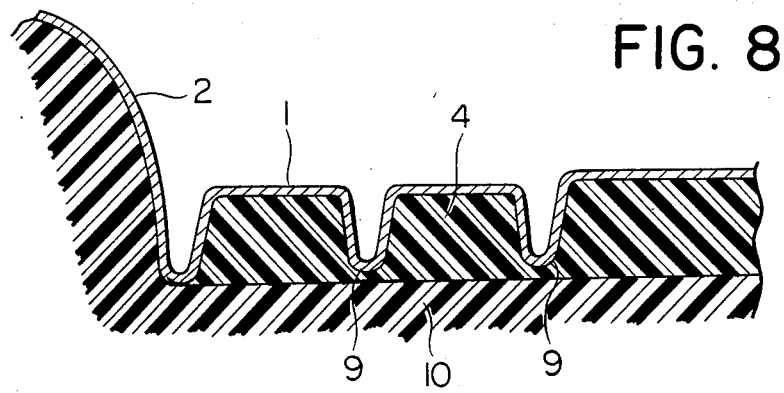

SEAT

BACKGROUND OF THE INVENTION

This invention relates to a seat comprising a seat surface covering made by a rationalized process.

A process used hitherto for the manufacture of a trim cover of a seat will be described, by way of example, with reference to FIG. 1 which is a schematic sectional view of a front seat cushion in an automobile, the section being taken in a direction orthogonal with respect to the running direction of the vehicle.

Referring to FIG. 1, three layers, that is, a covering material layer 1, a filler pad 4 and a backing material layer 5 are combined on bonded together at portions 9 to constitute what is referred to herein a main portion of a trim cover. This main portion is combined at lines X—X with inner side portions 2 of the surface covering with a welt 7 being interposed therebetween, and the inner side portions 2 of the surface covering are combined at lines Y—Y with outer side portions 3 with a welt 8 being interposed therebetween.

The trim cover formed in the manner above described provides the surface layer of a seat. Strips of suspension cloth 6 are connected to the trim cover and passed through slits (or holes) 10a of a mass of cushion providing material such as a molded polyurethane foam 10 to be fixed to springs 12 disposed beneath the molded polyurethane foam 10. The outer side portions 3 of the surface covering are fixed to a seat frame 11. It is apparent that the position of the slits 10a is in no way limited to that illustrated in FIG. 1.

The work for combining the main portion with the inner side portions 2 at the lines X—X, combining the inner side portions 2 with the outer side portions 3 at the lines Y—Y and connecting the suspension strips 6 to the springs 12 by machine sewing requires the worker's skill and is difficult to be automated. Pulling the suspension strips 6 downward for fixing the suspension strips 6 to the underneath springs 12 through the slits 10a of the molded polyurethane foam 10 requires a great force in addition to the skill, thereby making difficult to assemble the seat. Further, the presence of the slits 10a in the molded polyurethane foam 10 gives an uncomfortable feeling to the sitter and also provides a source of yielding rejects in the step of polyurethane foaming.

The combining portions 9 of the trim cover have been usually provided by high-frequency welding, and a material such as a low-melting polyurethane or a weldafoam has commonly been employed to provide the filler pad 4. However, these filler pad materials have physical properties poorer than those of usual machine-sewn filler pad materials and are also more expensive than the latter.

SUMMARY OF THE INVENTION

With a view to obviate the prior art defects pointed out above, it is a primary object of the present invention to provide an inexpensive seat which includes a trim cover provided by high-frequency welding of a filler pad of inexpensive usual polyurethane in lieu of the expensive low-melting polyurethane or weldafoam and includes also a welt formed by winding a welt cover or an end portion of the main portion or of inner side portions of the seat surface covering around a core or cord. In the present invention, such a trim cover is welded directly to a cushion material thereby dispensing with the use of suspension strips and rationalizing the assembling process to greatly reduce the cost of the seat.

BRIEF DESCRIPTION OF THE DRAWINGS

FIGS. 5A, 5B, 5C and 5D are schematic sectional views of modifications of the welts shown in FIGS. 2, 3, 4A and 4B.

FIG. 6 is a schematic sectional view of part of another embodiment of the present invention.

FIG. 7 is a schematic sectional view of part of a modification of the embodiment shown in FIG. 6.

FIG. 8 is a schematic sectional view of part of still another embodiment of the present invention.

DESCRIPTION OF THE PREFERRED EMBODIMENT

Figure 1:
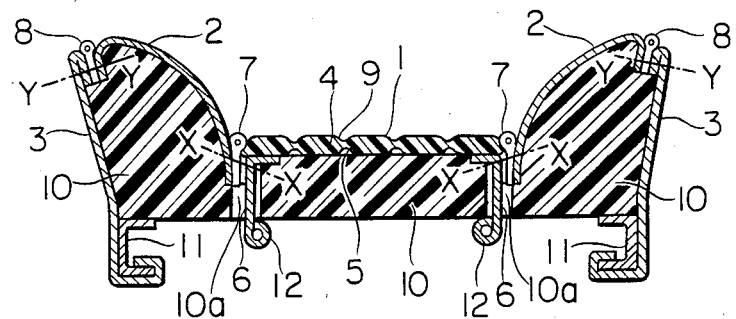
FIG. 1 is a schematic sectional view of a prior art seat.

The aforementioned prior art defects may be obviated by eliminating the suspension strips 6 shown in FIG. 1, eliminating also the slits 10a of the molded polyurethane foam 10 and bonding the surface of the backing material 5 of the main portion to the surface of the molded polyurethane foam 10. In this case, however, the lower marginal edges of the main portion combined at the lines X—X in FIG. 1 with the inner side portions 2 through the welt 7 protrude downward thereby making difficult to bond the backing material 5 to the molded polyurethane foam 10. This difficulty may be obviated by providing a recess on the surface of the molded polyurethane foam 10. However, the provision of such a recess gives rise to other defects including an undesirable increase in the cost due to an additional complicated step, an undesirable increased rate of production of rejects and an additional difficulty of accurate relative positioning of the trim cover and molded polyurethane foam prior to bonding.

Preferred embodiments of the present invention will now be described in detail with reference to FIGS. 2 to 8.

Figure 2:
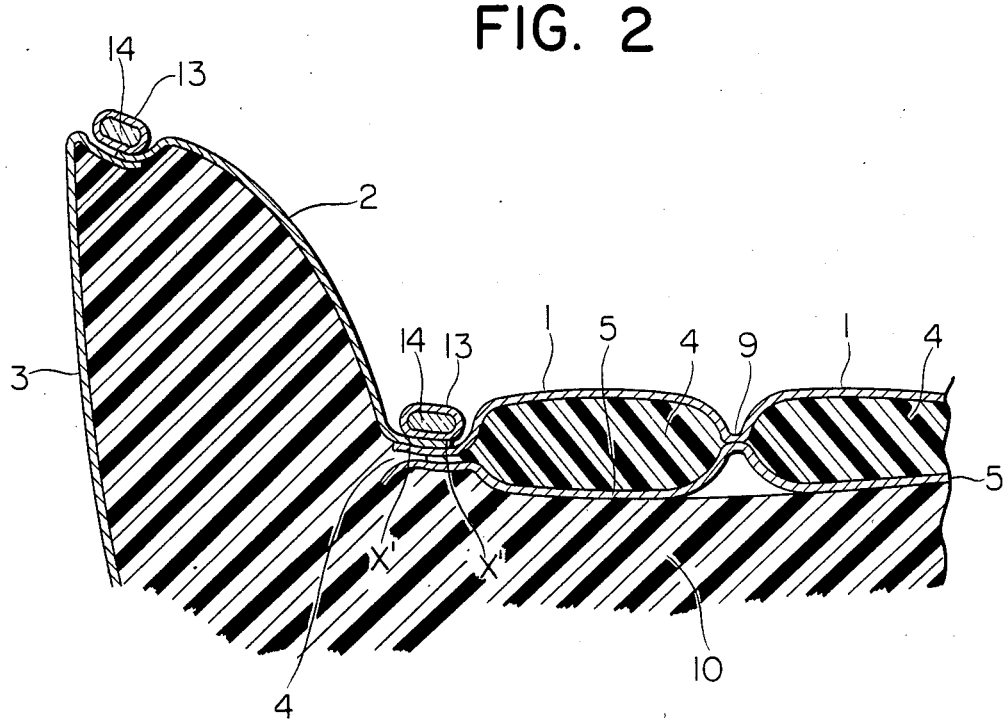
FIG. 2 is a schematic sectional view of part of an embodiment of the seat according to the present invention.

FIG. 2 shows an embodiment of the present invention which obviates the prior art defects pointed out with reference to FIG. 1. Referring to FIG. 2 in which the same reference numerals are used to designate the same or equivalent parts appearing in FIG. 1, the main portion and the inner side portions 2 are high-frequency welded at extensions X' of the joint together with a welt 13 formed by winding a welt cover around a cord 14. It can be readily seen that downward protrusions as shown at lines X—X in FIG. 1 are eliminated, and the bottom of the trim cover is made generally flat so that the trim cover can be easily and reliably bonded to the molded polyurethane foam 10.

Another welt 13 formed by winding a welt cover around a cord 14 can also be high-frequency welded together with the inner side portions 2 and the outer side portions 3 as shown.

These members can be high-frequency welded without requiring the skill of workers compared with the usual machine sewing, and any especial slits need not be provided in the molded polyurethane foam 10.

The main portion of the trim cover thus prepared is bonded to the molded polyurethane foam 10. When so required, the inner side portions 2 of the surface covering may also be bonded to the molded polyurethane foam 10.

Figure 3:
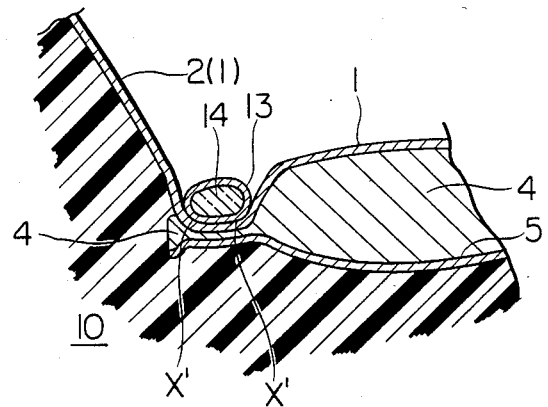
FIG. 3 is a schematic sectional view of part of a modification of the embodiment shown in FIG. 2.

FIG. 3 shows a modification of the embodiment shown in FIG. 2. In this modification, the covering material 1 of the main portion of the trim cover is extended to provide integral inner side portions 2. The arrangement shown in FIG. 3 is suitable for a trim cover including a continuous single covering material covering the filler pad 4 and facilitates further the high-frequency welding process shown in FIG. 2.

Figure 4A:
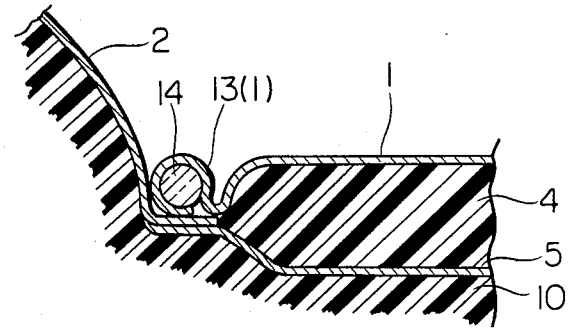
FIG. 4A is a schematic sectional view of part of a modification of the embodiment shown in FIG. 3.
Figure 4B:
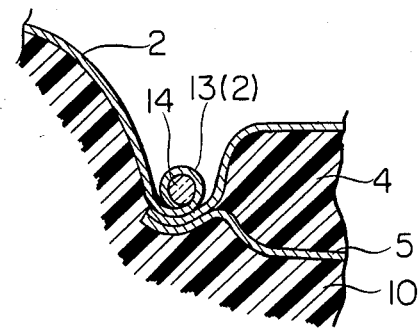
FIG. 4B is a schematic sectional view of part of another modification of the embodiment shown in FIG. 3.

FIG. 4A is a modification of the embodiment shown in FIG. 3 in that the welt 13 of the form shown in FIG. 3 is eliminated, and the cord 14 is covered with an extension of the covering material 1 of the main portion of the trim cover. The modification shown in FIG. 4A is preferred when the material of the welt 13 is the same as that of the covering material 1. FIG. 4B shows another modification of the embodiment shown in FIG. 3 in that the cord 14 is covered with an extension of the inner side portions 2 unlike FIG. 4A in which the cord 14 is covered with the extension of the covering material 1 of the main portion.

Welts 13A, 13B and 13C shown in FIGS. 5A, 5B and 5C respectively are modifications of those shown in FIGS. 2, 3, 4A and 4B in that the cord 14 is eliminated to leave the welt cover 13 alone. Although these welts 13A, 13B and 13C have a lower degree of roundness in external appearance than those 13 shown in FIGS. 2, 3, 4A and 4B, the absence of the cord 14 provides products giving the feeling of increased softness. The welt 13C shown in FIG. 5C is formed of, for example, a so-called vinyl leather. Since the vinyl layer forming the welt 13C has a hardness higher than that of a welt formed of a fabric material, the welt 13C includes folded portions. Thus, when, for example, the material of the inner side portions 2 shown in FIG. 4B is a vinyl leather, the welt 13 shown in FIG. 4B may have such a shape that the left-hand portion only of the welt 13C shown in FIG. 5C is folded.

A welt 13D shown in FIG. 5D is flat or planar without forming a loop in cross section. Such a welt 13D is employed depending on specifications.

FIG. 6 shows another embodiment of the present invention, and the same reference numerals are used therein to designate the same or equivalent parts appearing in FIG. 2. Referring to FIG. 6, a filler pad 4A is high-frequency welded together with the covering material 1 and backing material 5 at portions 9, and the filler pad 4 prepared separately is inserted between the covering material 1 and the filler pad 4A, so that the trim cover thus formed looks more protuberant in external appearance than that shown in FIG. 2. Although not illustrated, the filler pads 4 and 4A may be integrally molded.

Further, although not illustrated, the backing material 5 shown in FIG. 6 may be eliminated, and the filler pad 4A may be directly bonded or high-frequency welded to the molded polyurethane foam 10. Also, depending on the specification, the filler pad 4A shown in FIG. 6 may be eliminated as shown in FIG. 7, and the covering material 1 and filler pad 4 may be bonded or welded directly to the molded polyurethane foam 10. In FIG. 7, the covering material 1 has accurately 90°-shaped sharp corners 1a and 1b. Such corners 1a and 1b can be heat-shaped by use of an upper mold and a lower mold (not shown) prepared for shaping the covering material 1.

The material of the filler pads 4 and 4A shown in the drawings is the same as that customarily used for forming machine-sewn cushions. Therefore, the material of these filler pads 4 and 4A is less expensive and has higher physical properties than the filler pad material such as the low-melting polyurethane or weldafoam employed heretofore for high-frequency welding of trim covers.

However, the usual polyurethane has a melting point higher than that of the low-melting polyurethane and weldafoam. Therefore, when the material of the welt 13, inner side portions 2 or covering layer 1 as, for example, shown in FIG. 2 has a low melting point, the other materials may be excessively fused to be degraded in physical properties at the temperature at which the filler pad 4 is used. In such a case, it is preferable to cool the low-melting material, or to weld the welt 13, covering material 1 and backing material 5 together without extending the filler pad 4 to the positions X' shown in FIGS. 2 or 3, although not illustrated.

The present invention includes also a structure in which the welt is eliminated as shown in FIG. 8.

The covering layer 1 or inner side portions 2 may be laminated with a thin polyurethane layer or such a two-layer laminate may be further laminated with a backing layer.

During bonding of a trim cover to a molded polyurethane foam, a thin film (a skin) tending to cause peeling is frequently formed on the surface of the molded polyurethane foam under influence of, for example, a mold separating agent commonly used in the molding process. Therefore, it is preferable to use a molded polyurethane foam without any skin or with a minimum of such a skin.

The cushion material is in no way limited to the molded polyurethane foam referred to hereinabove, and any other suitable cushion material such as a polyurethane slab may be employed.

In the foregoing description, bonding with high-frequency welding has been referred to by way of example. However, the manner of bonding is in no way limited to the high-frequency welding, and bonding or welding may be attained with, for example, any other suitable heat source or ultrasonic generating means. Further, although the foregoing description has referred to the application of the present invention to a seat, the present invention is in no way limited to such specific application and is widely applicable to production of various articles including door pad linings in the vehicle compartment and articles of furniture.

It will be appreciated that the present invention, when applied to a seat, obviates prior art defects as pointed out already, permits use of an inexpensive polyurethane material usually employed for machine sewing of trim covers, eliminates the necessity of the special skill heretofore required, enables assembling of the seat even by an unskilled worker, and greatly reduces the cost of the seat.

What is claimed is:

1. A seat comprising a trim cover formed by heat-bonding necessary portions including a main portion, inner side portions, outer side portions and a welt, said main portion being formed of a covering material, a filler pad and a backing material to provide the central seating portion of the seat, wherein said welt is separately prepared by winding a welt cover around a cord, said filler pad is formed of a polyurethane material usually employed for making a machine-sewn cushion, and said trim cover is bonded to a cushion member having a minimum skin.

2. A seat as claimed in claim 1, wherein said welt is formed by winding an extension of said covering material or said inner side portions around the cord and has such a shape that the both ends thereof are not visible from outside.

3. A seat as claimed in claim 1, wherein said backing material is eliminated, and said filler pad is eliminated, and said filler pad is bonded directly to said cushion member.

4. A seat as claimed in claim 1, wherein said filler pad formed of the usual polyurethane material having a high melting point only extends to the bonded point of said welt, and said inner side portions of said covering, said backing material and said welt all of which have melting points lower than that of the usual polyurethane material, are bonded together.

5. A seat as claimed in claim 1, wherein said welt is eliminated, and said trim cover including said filler pad formed of the usual polyurethane material is bonded directly to said cushion member which has no skin.

6. A seat as claimed in claim 1, wherein said backing material and said welt are eliminated, and said filler pad is bonded directly to said cushion member.

7. A seat comprising a trim cover formed by heat-bonding a main portion, inner side portions, outer side portions and a welt together, said main portion being formed of a covering material, a filler pad and a backing material to provide the central seating portion of the seat, wherein said welt is separately prepared by winding a welt cover around a cord, said inner side portion and said covering material each having edge sections thereon that overlap under said welt and are heat bonded together, said filler pad is formed of a polyurethane material usually employed for making a machine-sewn cushion, and said trim cover is bonded to a cushion member by said backing material.

8. A seat comprising a trim cover formed by heat-bonding a main portion, inner side portions, outer side portions and a welt together, said main portion being formed of a covering material, a filler pad to provide the central seating portion of the seat, said filler pad is formed of a polyurethane material usually employed for making a machine-sewn cushion, and said covering material and said filler pad both are directly bonded to a cushion member.

9. A seat as claimed in claim 8, wherein said main portion includes a filler pad backing positioned between said filler pad and said cushion member.

* * * * *